(12) United States Patent
Gautier

(10) Patent No.: US 10,608,551 B2
(45) Date of Patent: Mar. 31, 2020

(54) RECTIFYING ELEMENT AND VOLTAGE CONVERTER COMPRISING SUCH A RECTIFYING ELEMENT

(71) Applicant: STMicroelectronics (Tours) SAS, Tours (FR)

(72) Inventor: Frederic Gautier, Monnaie (FR)

(73) Assignee: STMicroelectronics (Tours) SAS, Tours (FR)

(*) Notice: Subject to any disclaimer, the term of this patent is extended or adjusted under 35 U.S.C. 154(b) by 0 days.

(21) Appl. No.: 16/052,177

(22) Filed: Aug. 1, 2018

(65) Prior Publication Data
US 2019/0044454 A1    Feb. 7, 2019

(30) Foreign Application Priority Data

Aug. 2, 2017 (FR) .................... 17 57424
Aug. 2, 2017 (FR) .................... 17 57425
Aug. 2, 2017 (FR) .................... 17 57426

(51) Int. Cl.
*H02M 7/217* (2006.01)
*H02M 7/219* (2006.01)
(Continued)

(52) U.S. Cl.
CPC .............. *H02M 7/219* (2013.01); *G05F 3/20* (2013.01); *H02M 7/217* (2013.01);
(Continued)

(58) Field of Classification Search
CPC .... H02M 1/42; H02M 1/4208; H02M 1/4225; H02M 1/4233; H02M 7/162;
(Continued)

(56) References Cited

U.S. PATENT DOCUMENTS 5,153,453 A    10/1992 Walters
2005/0105311 A1*  5/2005 Soldano .............. H02M 1/4225
                                              363/89
(Continued)

FOREIGN PATENT DOCUMENTS

CN    204633609 U    9/2015

OTHER PUBLICATIONS

INPI Search Report and Written Opinion for FR 1757424 dated Feb. 8, 2018 (7 pages).
(Continued)

*Primary Examiner* — Jeffrey A Gblende
*Assistant Examiner* — Ivan A Laboy Andino
(74) *Attorney, Agent, or Firm* — Crowe & Dunlevy

(57) ABSTRACT

A rectifying element includes a MOS transistor series-connected with a Schottky diode. A bias voltage is applied between the control terminal of the MOS transistor and the terminal of the Schottky diode opposite to the transistor. A pair of the rectifying elements are substituted for diodes of a rectifying bridge circuit. Alternatively, the control terminal bias is supplied from a cross-coupling against the Schottky diodes. In another implementation, the Schottky diodes are omitted and the bias voltage applied to control terminals of the MOS transistors is switched in response to cross-coupled divided source-drain voltages of the MOS transistors. The circuits form components of a power converter.

17 Claims, 3 Drawing Sheets

(51) Int. Cl.
*H02M 1/42* (2007.01)
*H02M 7/5387* (2007.01)
*G05F 3/20* (2006.01)
*H02M 1/00* (2006.01)

(52) U.S. Cl.
CPC .. *H02M 7/5387* (2013.01); *H02M 2001/0032* (2013.01); *H02M 2007/2195* (2013.01)

(58) Field of Classification Search
CPC .. H02M 7/1623; H02M 7/1626; H02M 7/217; H02M 7/219; H02M 7/521; H02M 7/5387; H02M 7/53871; H02M 7/53873; H02M 2007/2195; G05F 3/20
USPC ........ 363/16–17, 55–56.05, 97–98, 131–132
See application file for complete search history.

(56) References Cited

U.S. PATENT DOCUMENTS

| | | | |
|---|---|---|---|
| 2006/0062026 A1 | 3/2006 | Wittenbreder, Jr. | |
| 2008/0291699 A1* | 11/2008 | Sells | H02M 7/219 363/17 |
| 2009/0273959 A1* | 11/2009 | Sells | H02M 7/219 363/127 |
| 2011/0075461 A1* | 3/2011 | Sells | H02M 1/08 363/127 |
| 2011/0141782 A1* | 6/2011 | Sells | H02M 7/219 363/127 |
| 2013/0077371 A1 | 3/2013 | Liquicia et al. | |
| 2014/0268956 A1* | 9/2014 | Teren | H02M 7/219 363/89 |
| 2014/0354246 A1 | 12/2014 | Xu et al. | |
| 2015/0131343 A1* | 5/2015 | Hufnagel | H02M 1/42 363/49 |

OTHER PUBLICATIONS

INPI Search Report and Written Opinion for FR 1757425 dated Feb. 23, 2018 (8 pages).

INPI Search Report and Written Opinion for FR 1757426 dated Feb. 16, 2018 (8 pages).

* cited by examiner

US 10,608,551 B2

RECTIFYING ELEMENT AND VOLTAGE CONVERTER COMPRISING SUCH A RECTIFYING ELEMENT

PRIORITY CLAIM

This application claims the priority benefit of French Application for Patent No. 1757424, filed on Aug. 2, 2017, the priority benefit of French Application for Patent No. 1757425, filed on Aug. 2, 2017, and the priority benefit of French Application for Patent No. 1757426, filed on Aug. 2, 2017, the contents of which are hereby incorporated by reference in their entireties to the maximum extent allowable by law.

TECHNICAL FIELD

The present disclosure generally relates to electronic circuits. It more particularly relates to rectifying elements or circuits and to switched-mode power converters.

BACKGROUND

An AC-DC converter is commonly used to supply a DC voltage to electronic devices from an AC voltage (for example, the AC voltage of the electric power supply mains). Among such converters, switched-mode power converters are preferred for their efficiency.

There is a need to improve the efficiency of switched-mode power converters.

SUMMARY

An embodiment provides a rectifying element having an improved efficiency.

An embodiment provides a solution particularly adapted to a switched-mode power converter.

An embodiment provides a solution particularly adapted to a switched-mode power converter comprising a rectifying half-bridge.

Thus, an embodiment provides a rectifying element comprising a MOS transistor series-connected with a Schottky diode, configured to receive a substantially constant voltage between the control terminal of the transistor and the terminal of the Schottky diode opposite to the transistor.

According to an embodiment, a source of the transistor is connected to a cathode of the Schottky diode.

According to an embodiment, the constant voltage is selected so that the transistor is conducting when the Schottky diode is conducting.

According to an embodiment, the transistor is of N-channel enrichment type.

Another embodiment provides a voltage converter comprising at least one rectifying circuit such as defined hereabove.

According to an embodiment, a first rectifying element is connected between a first input terminal of the converter and a first output terminal of the converter, the anode of the Schottky diode of the first rectifying element being connected to the first output terminal.

According to an embodiment, a second rectifying element is connected between a second input terminal of the converter and the first output terminal, the anode of the Schottky diode of the second rectifying element being connected to the first output terminal.

According to an embodiment, the converter further comprises a first inductive element and at least one first diode series-connected between the second input terminal of the converter and the second output terminal of the converter; and a first switch connecting the first output terminal to the junction point of the first inductive element and of the first diode.

According to an embodiment, the converter further comprises a second inductive element and a second diode series-connected between the first input terminal and the second output terminal; and a second switch connecting the first output terminal to the junction point of the second inductive element and of the second diode.

According to an embodiment, the converter further comprises a second diode connected between the second input terminal and a terminal of the first inductive element opposite to the first diode.

According to an embodiment, the converter further comprises a third diode connected between the first input and said terminal of the first inductive element.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
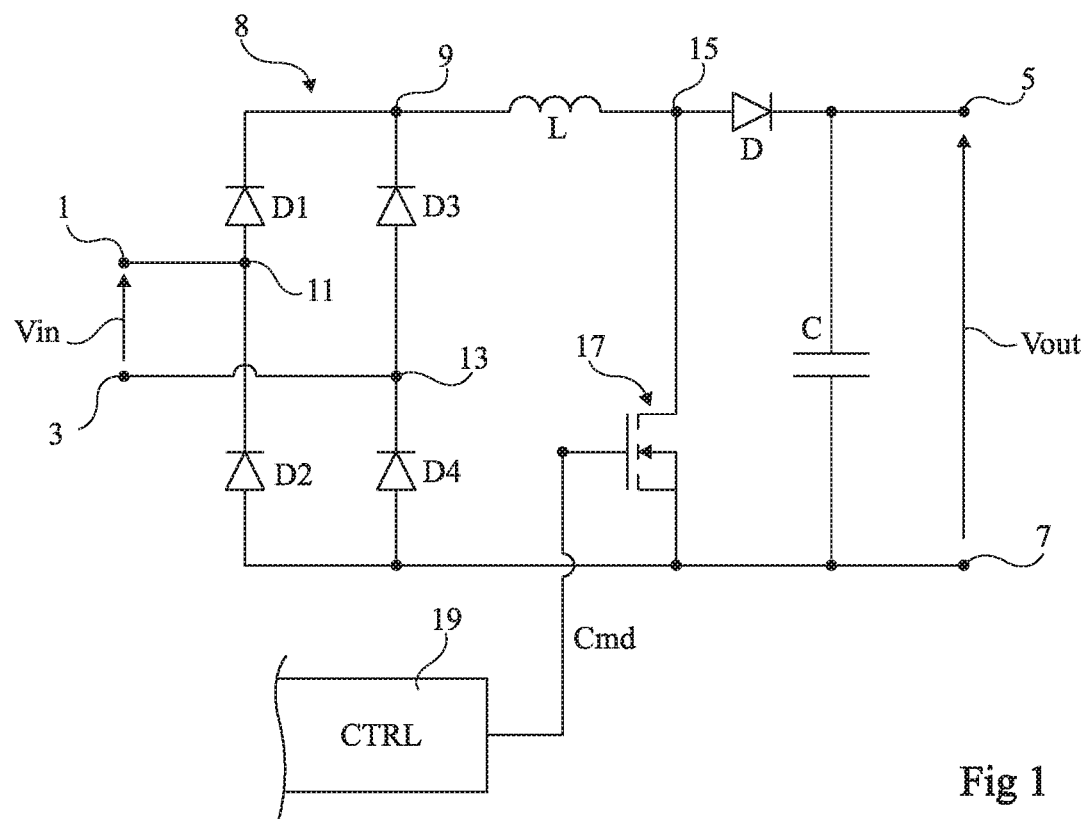
FIG. 1 shows an example of a switched-mode power converter.

The same elements have been designated with the same reference numerals in the different drawings. For clarity, only those steps and elements which are useful to the understanding of the described embodiments have been shown and are detailed. In particular, the operation of the described switched-mode power converters has not been detailed, the described embodiments being compatible with usual operations of such converters.

Unless otherwise specified, when reference is made to two elements connected together, this means directly connected with no intermediate element other than conductors, and when reference is made to two elements coupled together, this means that the two elements may be directly coupled (connected) or coupled via one or a plurality of other elements.

Unless otherwise specified, term "substantially" means to within 10%, preferably to within 5%.

FIG. 1 shows an example of a switched-mode power converter.

The converter comprises two input terminals 1 and 3 intended to receive an AC voltage Vin and two output terminals 5 and 7 intended to supply a DC voltage Vout referenced to terminal 7, typically the ground. Input terminals 1 and 3 are connected to the input of a diode bridge 8 comprising, in parallel, two branches of series-connected diodes, respectively D1 and D2 and D3 and D4. The anode of diode D1 is connected to the cathode of diode D2 and the anode of diode D3 is connected to the cathode of diode D4. Junction points 11 and 13 of diodes D1 and D2 and of diodes D3 and D4 are respectively connected to terminals 1 and 3. An output node 9 of the bridge is coupled to output terminal 5 by an inductive element L (typically an inductance) and a diode D connected in series, the cathode of diode D being connected to terminal 5. Junction point 15 of the series association of inductance L and of diode D is coupled to terminal 7 by a cut-off switch 17. Switch 17 is a MOS transistor that is controlled in pulse width modulation (PWM) by a signal Cmd at a frequency greater than that of voltage Vin, typically by a ratio of at least 10, preferably of at least 100. Signal Cmd is supplied by a control circuit 19 (CTRL). A capacitive element C (typically, a capacitor) is connected between output terminals 5 and 7 of the converter.

When switch 17 is on, inductance L stores power. During a positive halfwave of voltage Vin, a current flows from terminal 1 to terminal 3, through diode D1, inductance L, switch 17, and diode D4. During a negative halfwave of voltage Vin, a current flows from terminal 3 to terminal 1, through diode D3, inductance L, switch 17, and diode D2.

When switch 17 turns off, inductance L gives back the stored power to capacitor C and a current flows, from one terminal to the other of inductance L, through free wheel diode D, capacitor C, and diode bridge 8.

The voltage drop in the bipolar diodes in the conducting state adversely affects the converter efficiency. This phenomenon is all the more disturbing at low power, that is, when the power requested by the load (not shown) connected to the output terminals of the converter is low and voltage Vout is low.

This phenomenon more generally takes place in any voltage converter. In particular, this concerns voltage converters, be they switched-mode converters or not, full-bridge or half-bridge, halfwave or fullwave, etc.

In the described embodiments, it is provided to replace one or a plurality of bipolar diodes of a converter with a rectifying element or circuit having a low on-state voltage drop as compared with a bipolar diode, at least at low power.

Figure 2:
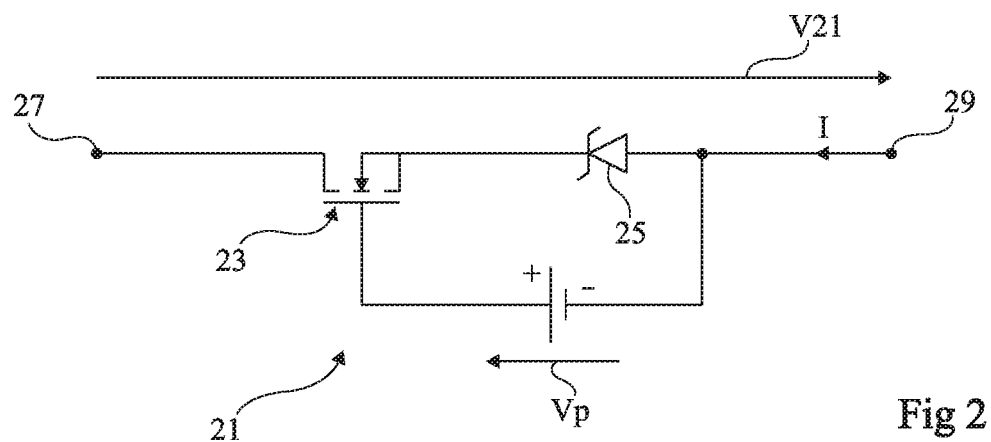
FIG. 2 shows an embodiment of a rectifying element.

FIG. 2 shows an embodiment of a rectifying element 21.

Rectifying element 21 comprises a MOS transistor 23 and a Schottky diode 25 series-connected between two terminals 27 and 29. As an example, the anode of diode 25 is connected to terminal 29 and the cathode of diode is connected to the source terminal of the MOS transistor 23, with the drain of transistor 23 coupled to terminal 27. Transistor 23 is preferably an enrichment MOS transistor, non-conducting in the idle state and turned on by the applying of a gate-source voltage greater than its threshold voltage Vth. Transistor 23 preferably is an N-channel transistor. Transistor 23 is for example a MOS power transistor.

In operation, a substantially constant DC voltage Vp is applied between the gate of transistor 23 and terminal 29. Voltage Vp is selected so that the voltage between the gate and the source of transistor 23 is greater than threshold voltage Vth of the transistor when diode 25 is in the conducting state, so that transistor 23 is in the conducting state when diode 25 is in the conducting state. When a current I flows from terminal 29 to terminal 27, diode 25 and transistor 23 are conducting and voltage V21 between terminals 29 and 27 is positive. Voltage V21 is equal to the sum of the voltage drop in diode 25 and of the voltage drop between the (source-drain) conduction terminals of transistor 23 which depends, in particular, on voltage Vp. When voltage V21 is negative, diode 25 is non-conducting. The leakage current in diode 25 is then regulated by transistor 23, which avoids the diode breakdown. In rectifying element 21, the compromise between the on-state voltage drop and the off-state leakage current is determined by the selection of voltage Vp. It should be noted that the body of transistor 23 may contribute to ensuring the activation of the voltage source supplying voltage Vp.

By replacing bipolar diodes of a converter with rectifying elements 21, the converter efficiency is improved, at least at low power. Indeed, at low power, the voltage drop in a bipolar diode is no longer negligible with respect to output voltage Vout of the converter, which causes a decrease in the low-power efficiency with respect to the high-power efficiency. Advantage is here taken from the fact that the threshold voltage of a Schottky diode is lower than that of a bipolar diode. Element 21 thus enables to limit such a decrease in the low-power efficiency, and thus to improve the low-power efficiency of the converter with respect to that of a converter comprising bipolar diodes. As an example, for a current I equal to 1 A, voltage V21 is lower by 0.2 V than the voltage drop in a bipolar diode and, for a 100-mA current, voltage V21 is lower by 0.7 V than the voltage drop in the bipolar diode.

It could have been devised to simply replace the bipolar diodes with Schottky diodes. However, this would only work at low voltage and not in power applications.

According to an embodiment, each of diodes D2 and D4 of the lower half-bridge of the converter of FIG. 1 is replaced with a rectifying element 21 having its terminal 29 connected to terminal 7, which enables to improve the converter efficiency.

It should be noted that it is generally not necessary to provide a specific voltage source to generate voltage Vp. Indeed, it is sufficient to use the power supply voltage of the converter control circuit (19, FIG. 1).

As a variation, each rectifying element 21 further comprises a bipolar diode (in practice, diode D2 or D4) connected in parallel with the series coupling of transistor 23 and diode 25, the anode of the bipolar diode being for example connected to terminal 29 of rectifying element 21 and the cathode of the bipolar diode being for example connected to terminal 27. This protects rectifying element 21 against too high current peaks capable of deteriorating it. The bipolar diode may further improve the converter efficiency, particularly at high power.

Figure 3:
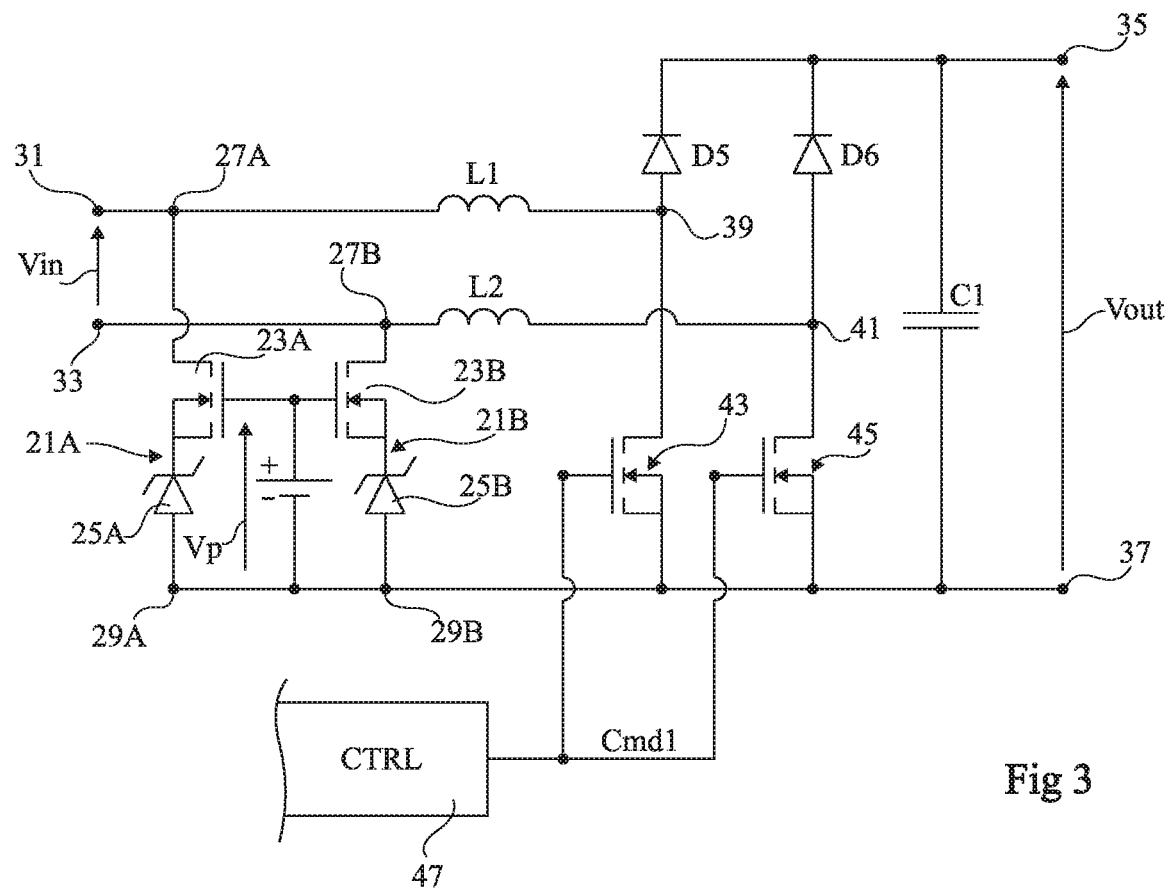
FIG. 3 shows an embodiment of a switched-mode power converter comprising rectifying elements such as the rectifying element shown in FIG. 2.

FIG. 3 shows an embodiment of a half-bridge switched-mode power converter comprising rectifying elements such as rectifying element 21 shown in FIG. 2.

The converter comprises two input terminals 31 and 33 intended to receive an AC voltage Vin and two output terminals 35 and 37 intended to supply a DC voltage Vout, for example referenced to terminal 37, typically the ground. Terminals 31 and 33 are coupled to terminal 37 by a lower half-bridge comprising two rectifying elements 21A and 21B, each identical to rectifying element 21 of FIG. 2. Each of elements 21A and 21B comprises the same components as element 21, designated with the same reference numerals, to which have been appended respective letters A and B. Terminals 29A and 29B are connected to terminal 37. Terminal 27A is connected to terminal 31 and terminal 27B is connected to terminal 33. Terminals 31 and 33 are further respectively coupled to terminal 35 by the series association of an inductive element L1 (typically an inductance) and of a free wheel diode D5, and by the series association of an inductive element L2 (typically an inductance) and of a free wheel diode D6. The cathode terminals of diodes D5 and D6 are connected to terminal 35. The junction points 39 and 41 of the series associations of inductance L1 and of diode D5, and of inductance L2 and of diode D6, are respectively coupled to terminal 37 by cut-off switches 43 and 45. Switches 43 and 45, here MOS transistors, are controlled in pulse-width modulation, for example, by a same signal Cmd1, at a frequency greater than that of voltage Vin, typically by a ratio of at least 10, preferably of at least 100. Signal Cmd1 is supplied by a control circuit 47 (CTRL). A capacitive element C1 (typically, a capacitor) is connected between output terminals 35 and 37 of the converter.

In operation, as described in relation with FIG. 2, a substantially constant voltage Vp is applied to rectifying elements 21A and 21B. Preferably, a single voltage source enables to supply voltage Vp to the two rectifying elements 21A and 21B, for example, the voltage source which is also powering control circuit 47. During positive halfwaves of voltage Vin between terminal 31 and terminal 33, when switch 43 is on, inductance L1 stores power and a current flows from terminal 31 to terminal 33, through inductance L1, switch 43, and element 21B. When switch 43 turns off, inductance L1 gives back this power to capacitor C1 and a current flows from one terminal to the other of inductance L1, through diode D5, capacitor C1, and rectifying element 21B. Symmetrically, during negative halfwaves of voltage Vin, when switch 45 is on, inductance L2 stores power and a current flows from terminal 33 to terminal 31, through inductance L2, switch 45, and rectifying element 21A. When switch 45 turns off, inductance L2 gives back this power to capacitor C1 and a current flows from one terminal to the other of inductance L2, through diode D6, capacitor 1, and rectifying element 21A.

The converter of FIG. 3 has an improved efficiency with respect to a similar bipolar diode converter, more particularly at low power.

Figure 4:
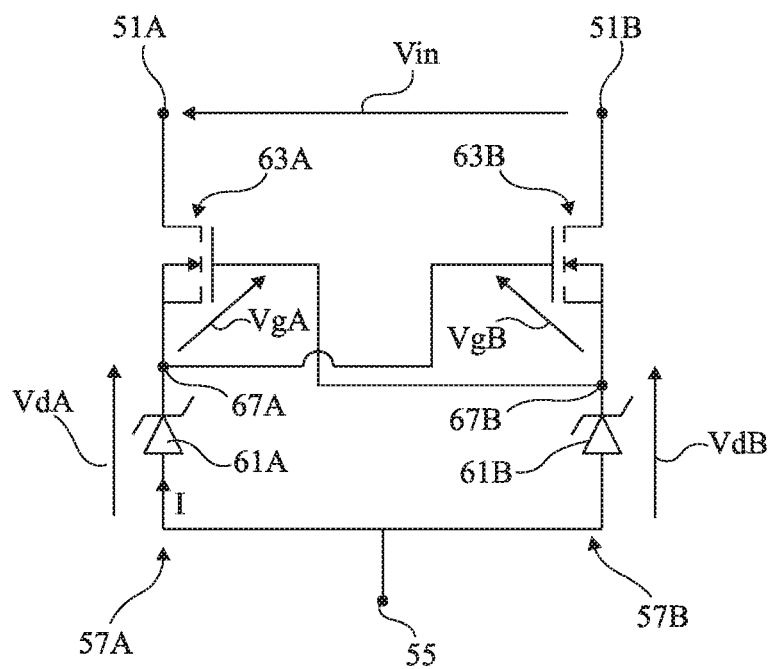
FIG. 4 shows an embodiment of a rectifying circuit.

FIG. 4 shows an embodiment of a rectifying circuit with a common anode.

The rectifying circuit comprises two cathode terminals 51A and 51B intended to receive an AC voltage Vin, and an anode terminal 55, for example, intended to be set to a reference potential such as the ground. Two identical branches 57A and 57B are respectively connected between terminal 55 and terminals 51A and 51B. Each of branches 57A and 57B comprises a Schottky diode, respectively 61A and 61B, and a MOS transistor, respectively 63A and 63B, connected in series. The junction point or common node 67A of diode 61A and of transistor 63A is connected to the gate of transistor 63B. The junction point or common node 67B of diode 61B and of transistor 63B is connected to the gate of transistor 63A. Transistors 63A and 63B are for example enrichment N-channel transistors. Transistors 63A and 63B are for example power transistors. The anodes of diodes 61A and 61B are for example connected to terminal 55.

In operation, voltage VgA between the gate and the source (node 67A) of transistor 63A is equal to voltage VdB between node 67B and terminal 55 minus voltage VdA between node 67A and terminal 55. Voltage VgB between the gate and the source (node 67B) of transistor 63B is equal to −VgA. Thus, when transistor 63A is conducting, transistor 63B is non-conducting and, conversely, when transistor 63B is conducting, transistor 63A is non-conducting. More particularly, during a negative halfwave of voltage Vin between terminal 51A and terminal 51B, diode 61B is non-conducting. If voltage VdB is sufficient for voltage VgA to be greater than threshold voltage Vth of transistor 63A, transistor 63A and diode 61A are conducting and a current I flows from terminal 55 to terminal 51A. Branch 57A is then equivalent to a conducting diode. Further, in branch 57B, transistor 63B is off due to the fact that VgB=−VgA and the leakage current in diode 61B is substantially equal to the leakage current in transistor 63B. Branch 57B is then equivalent to a non-conducting diode. During a positive halfwave of voltage Vin, the operation of the rectifying circuit is symmetrical to that described hereabove. In other words, when voltage VdA is sufficient for voltage VgB to be higher than threshold voltage Vth of transistor 63B, branches 57B and 57A are respectively equivalent to a conducting diode and to a non-conducting diode.

Figure 5:
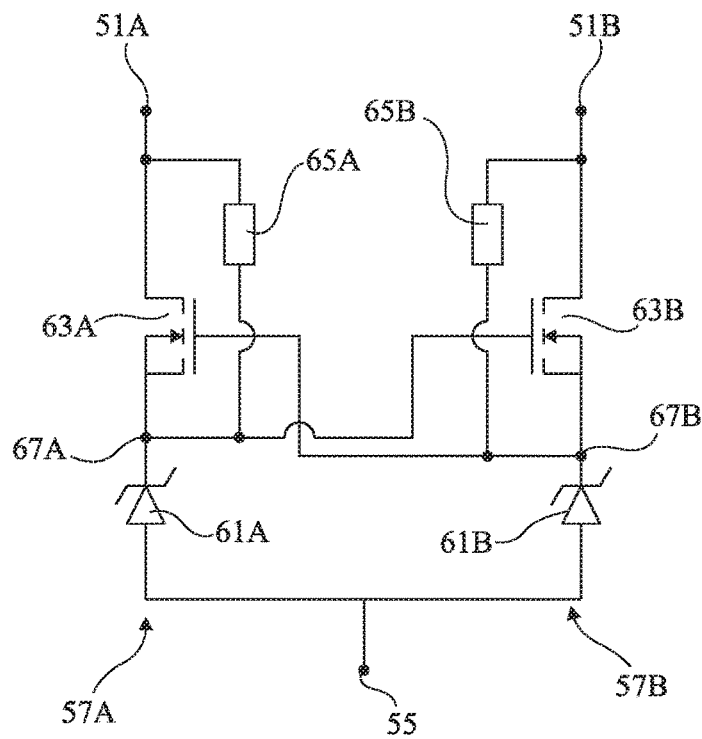
FIG. 5 shows an alternative embodiment of the rectifying circuit of FIG. 4.

FIG. 5 shows an alternative embodiment of the rectifying circuit of FIG. 4.

This rectifying circuit is identical to that of FIG. 4, with the difference that each of branches 57A and 57B further comprises a resistor, respectively 65A and 65B, connected in parallel with its transistor 63A or 63B. This circuit operates in the same way as the circuit of FIG. 4 with the difference that, when branch 57A is non-conducting, the leakage current of non-conducting Schottky diode 61A totally or partly flows through resistor 65A to set the voltage across diode 61A so that transistor 63B is conducting. Symmetrically, when branch 57B is non-conducting, the leakage current of Schottky diode 61B totally or partly flows through resistor 65B to set the voltage across diode 61B so that transistor 63A is conducting.

When the rectifying circuit of FIG. 4 or 5 replaces bipolar diodes of a converter, for example, the bipolar diodes of the lower half-bridge of the converter, the converter output is improved, at least at low power. Indeed, at low power, the voltage drop across a conducting branch 57A or 57B is lower than the voltage drop across a bipolar diode. As for the rectifying element of FIG. 2, advantage is here taken from the fact that the threshold voltage of a Schottky diode is smaller than that of a bipolar diode.

According to an embodiment, the rectifying circuit of FIG. 4 or 5 replaces the lower half-bridge (diodes D2 and D4) of the converter of FIG. 1, terminals 51A, 51B, and 55 of the rectifying circuit being respectively connected to terminals 1, 3, and 7.

According to another embodiment, the rectifying circuit of FIG. 4 or 5 replaces the lower half-bridge (rectifying elements 21A and 21B) of the converter of FIG. 3, terminals 51A, 51B, and 55 of the rectifying circuit being respectively connected to terminals 31, 33, and 37. The use of the rectifying circuit of FIG. 4 or 5 rather than rectifying elements 21 enables to do away with a possible voltage drop Vp.

As a variation, a bipolar diode is connected in parallel with each of branches 57A and 57B of the rectifying circuit of FIG. 4 or 5, the anode of the bipolar diode being connected to terminal 55. The bipolar diodes enable to protect this circuit against strong current peaks capable of deteriorating it. The bipolar diodes may further improve the converter efficiency, particularly at high power.

Figure 6:
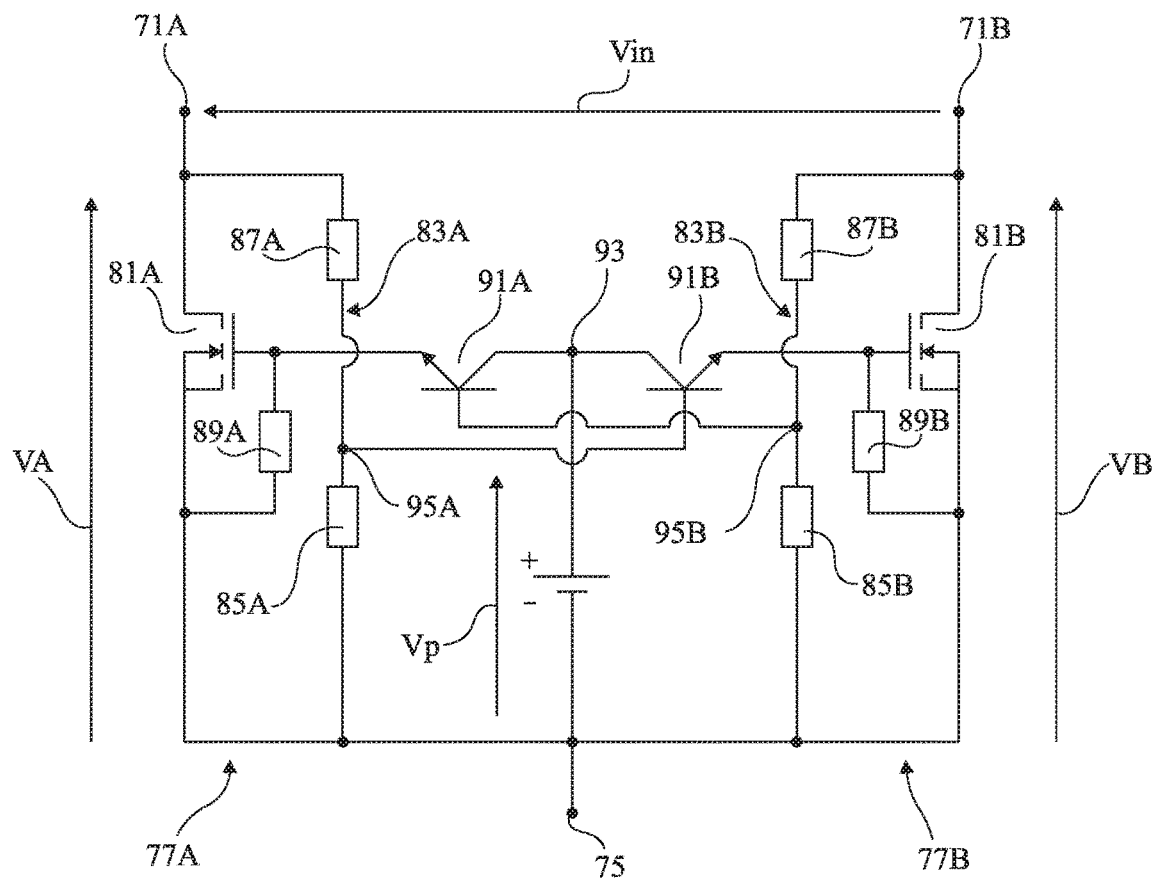
FIG. 6 shows another embodiment of a rectifying circuit.

FIG. 6 shows another embodiment of a rectifying circuit.

The rectifying circuit comprises two cathode terminals 71A and 71B intended to receive an AC voltage Vin, and an anode terminal 75, for example, intended to be set to a reference potential such as the ground. Two identical branches 77A and 77B are respectively connected between terminal 75 and terminals 71A and 71B. Each of branches 77A and 77B comprises, in parallel, a MOS transistor, respectively 81A and 81B, and a voltage divider, respectively 883A and 83B. Each of voltage dividers 83A and 83B is for example a resistive voltage divider, comprising two series-connected resistors, respectively 85A and 87A, and 85B and 87B. Transistors 81A and 81B are for example enrichment transistors. Transistors 81A and 81B are for example power transistors. Transistors 81A and 81B for example have an N-channel, their sources being then connected to terminal 75. Each of branches 77A and 77B also comprises a component, respectively 89A and 89B, for example, a resistor, connected between the gate and the source of transistor 81A or 81B of this branch to enable to discharge the gate-source capacitance of the transistor. Each of branches 77A and 77B further comprises a switch, respectively 91A and 91B, for example, an NPN-type bipolar transistor. Transistors 91A and 91B are, in the shown example, series-connected between the gates of transistors 81A and 81B. Junction point 93 of this series association is intended to receive a substantially constant DC voltage Vp, referenced to ground 75. In this example, the collectors of transistors 91A and 91B are on the side of node 93. The respective bases of transistors 91A and 91B are connected to nodes 95B and 95A, that is, to the output of the voltage divider of the opposite branch.

Voltage Vp is selected so that, when switch 91A, 91B of a branch 77A, 77B is on, the voltage between the gate and the source of transistor 81A, 81B of this branch is higher than threshold voltage Vth of the transistor.

In operation, during a negative halfwave of voltage Vin between terminal 71A and terminal 71B, switch 91B, controlled by voltage divider 83A from voltage VA, is turned off. Transistor 81B is then made non-conducting. Further, switch 91A of branch 77A, controlled by voltage divider 83B from voltage VB, is turned on if voltage VB is sufficient. Transistor 81A is then conducting. Symmetrically, during a positive halfwave of voltage Vin, transistor 81B is conducting if voltage VA is sufficient, and transistor 81A is non-conducting. In practice, the minimum value of voltage VA, VB causing the turning-on of the corresponding switch 91B, 91A is determined by voltage divider 83A, 83B controlling the switch, that is, here, by the values of resistors 85A, 87A, and 85B, 87B. Further, when voltages VA and VB are such that the two switches 91A and 91B are off, the intrinsic diodes of MOS transistors 81A and 81B may enable a current to flow from terminal 75 to terminal 71A or 71B.

The voltage drop in a branch 77A, 77B, having a conducting transistor 81A, 81B, is lower, at least at low power, than in a conducting element 21 or in a conducting branch 57A, 57B of the rectifying circuit of FIG. 4 or 5. Advantage is here taken from the fact that branches 77A and 77B comprise no Schottky diode. As a result, a converter comprising the rectifying circuit of FIG. 6 has an improved efficiency, at least at low power, as compared with that of a converter comprising rectifying elements 21 or of a converter comprising the rectifying circuit of FIG. 4 or 5.

According to an embodiment, the rectifying circuit of FIG. 6 replaces the lower half-bridge (diodes D2 and D4) of the converter of FIG. 1, for example by connecting terminals 71A, 71B, and 75 of the rectifying circuit to respective terminals 1, 3, and 7 of the converter.

According to another embodiment, the rectifying circuit of FIG. 6 replaces the lower half-bridge (elements 21A and 21B) of the converter of FIG. 3, for example by connecting terminals 71A, 71B, and 75 of the rectifying circuit to respective terminals 31, 33, and 37 of the converter.

As a variation, a bipolar diode is connected in parallel with each of branches 77A and 77B of the rectifying circuit, the anode of the bipolar diode being connected to terminal 75. The bipolar diodes enable to protect this circuit against strong current peaks capable of deteriorating it. The bipolar diodes may further improve the converter efficiency, particularly at high power.

It should be noted that it is generally not necessary to provide an additional voltage source to generate voltage Vp. Indeed, it is sufficient to use the power supply voltage of the converter control circuit (19, FIG. 1; 47, FIG. 3).

As an example, in the embodiments previously described in relation with FIGS. 1 to 6, the MOS power transistors withstand up to several hundreds of volts, for example, 600 V, between their conduction terminals (drain-source). The Schottky diodes for example have a breakdown voltage lower than a few tens of volts, for example equal to 15 V, and are called low-voltage diodes. The AC voltage Vin applied to the converters and/or to the rectifying circuits for example has an amplitude capable of reaching one or a plurality of hundreds of volts.

Specific embodiments have been described. Various alterations, modifications, and improvements will readily occur to those skilled in the art. In particular, rectifying element 21 may be used to replace a bipolar diode in other electronic circuits than converters.

Switched-mode converters where the input terminals are coupled to the output terminals via one or a plurality of circuits of booster type have been described. The described embodiments easily transpose to any type of AC/DC voltage converter, for example, of buck type, of buck-boost type, of Ćuk type, of Forward type, of Flyback type, etc. Further, the described embodiments of rectifying element 21 transpose to any type of AC/DC voltage converter, be it a single-phase or a three-phase converter.

The previously-described rectifying elements and circuits may also be used in switched-mode converters where the free wheel diode(s) are replaced with switches controlled in synchronized fashion with the cut-off switch(es).

Various embodiments with various variations have been described hereabove. It should be noted that those skilled in the art may combine various elements of these various embodiments and variations without showing any inventive step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A circuit, comprising:
   a first MOS transistor having a source coupled to a first terminal and a drain coupled to a second terminal;
   a second MOS transistor having a source coupled to the first terminal and a drain coupled to a third terminal;
   a first voltage divider coupled between the first and second terminals and having a first intermediate node;
   a second voltage divider coupled between the first and third terminals and having a second intermediate node;
   a first transistor switch coupled between a third intermediate node and a control terminal of the first MOS transistor, wherein a control terminal of the first transistor switch is coupled to the second intermediate node; and
   a second transistor switch coupled between the third intermediate node and a control terminal of the second MOS transistor, wherein a control terminal of the second transistor switch is coupled to the first intermediate node.

2. The circuit of claim 1, further comprising a voltage source configured to generate a substantially constant voltage between the third intermediate node and the first terminal.

3. The circuit of claim 1, wherein first terminal is an anode terminal of the circuit, the second terminal is a first cathode terminal of the circuit, and the third terminal is a second cathode terminal of the circuit.

4. The circuit of claim 1, wherein each of the first and second transistor switches is a bipolar transistor.

5. The circuit of claim 1, wherein each of the first and second voltage dividers is a resistive voltage divider.

6. The circuit of claim 1, wherein each of the first and second MOS transistors is of N-channel enrichment type.

7. The circuit of claim 1, further comprising:
a first resistor coupled between the control terminal of the first MOS transistor and the source of the first MOS transistor; and
a second resistor coupled between the control terminal of the second MOS transistor and the source of the second MOS transistor.

8. The converter of claim 1, wherein each of the first and second transistor switches is a bipolar transistor.

9. A voltage converter, comprising:
a rectifying bridge circuit comprising:
a first diode;
a first MOS transistor coupled in series with the first diode between a first terminal and a second terminal, wherein said first MOS transistor is coupled between the second terminal and a first input terminal;
a second diode;
a second MOS transistor coupled in series with the second diode between the first terminal and the second terminal, wherein said second MOS transistor is coupled between the second terminal and a second input terminal;
a first voltage divider coupled between the first input terminal and the second terminal and having a first intermediate node;
a second voltage divider coupled between the second input terminal and the second terminal and having a second intermediate node;
a first transistor switch coupled between a third intermediate node and a control terminal of the first MOS transistor, wherein a control terminal of the first transistor switch is coupled to the second intermediate node; and
a second transistor switch coupled between the third intermediate node and a control terminal of the second MOS transistor, wherein a control terminal of the second transistor switch is coupled to the first intermediate node.

10. The converter of claim 9, wherein the second terminal is connected to an output of the converter.

11. The converter of claim 9, further comprising:
an inductor coupled in series between the first diode and the first MOS transistor; and
a transistor switch driven by a pulse width modulation control signal and coupled between the second terminal and a series node of the series coupled inductor and first diode.

12. The converter of claim 9, further comprising:
a first inductive element coupled in series with the first MOS transistor and the first diode, the first inductive element located between the first MOS transistor and the first diode; and
a first transistor switch driven by a pulse width modulation control signal and coupled between a first junction point and the second terminal, wherein the first junction point connects the first inductive element and the first diode.

13. The converter of claim 12, further comprising:
a second inductive element coupled in series with the second MOS transistor and the second diode, the second inductive element located between the second MOS transistor and the second diode; and
a second transistor switch driven by a pulse width modulation control signal and coupled between a second junction point and the second terminal, wherein the second junction point connects the second inductive element and the second diode.

14. The converter of claim 9, wherein each of the first and second voltage dividers is a resistive voltage divider.

15. The converter of claim 9, wherein each of the first and second MOS transistors is of N-channel enrichment type.

16. The converter of claim 9, further comprising:
a first resistor coupled between the control terminal of the first MOS transistor and the source of the first MOS transistor; and
a second resistor coupled between the control terminal of the second MOS transistor and the source of the second MOS transistor.

17. The converter of claim 9, further comprising a voltage source configured to generate a substantially constant voltage between the third intermediate node and the second terminal.

* * * * *